(12) United States Patent
Pointer

(10) Patent No.: US 6,771,065 B2
(45) Date of Patent: Aug. 3, 2004

(54) LINE HALL EFFECT DETECTOR AND METHOD OF SENSING ANGULAR POSITION PARTICULARLY SUITED FOR ELECTRICAL ROTARY ACTUATOR

(75) Inventor: Jon S. Pointer, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 100 days.

(21) Appl. No.: 09/793,356

(22) Filed: Feb. 26, 2001

(65) Prior Publication Data

US 2002/0118010 A1 Aug. 29, 2002

(51) Int. Cl.⁷ ............................... G01B 7/30
(52) U.S. Cl. .................... 324/207.2; 324/207.25
(58) Field of Search ................ 324/207.12, 207.2, 324/207.24, 207.25, 207.21, 207.22, 207.26; 338/324

(56) References Cited

U.S. PATENT DOCUMENTS

| | | | | |
|---|---|---|---|---|
| 3,530,317 A | * | 9/1970 | Lang | 310/10 |
| 4,283,679 A | * | 8/1981 | Ito et al. | 324/165 |
| 4,893,502 A | * | 1/1990 | Kubota et al. | 324/207.2 |
| 5,444,369 A | * | 8/1995 | Luetzow | 123/376 |
| 5,880,586 A | * | 3/1999 | Dukart et al. | 324/207.2 |
| 6,016,055 A | * | 1/2000 | Jager et al. | 324/165 |
| 6,356,073 B1 | * | 3/2002 | Hamaoka et al. | 324/207.2 |

FOREIGN PATENT DOCUMENTS

JP         01259217         * 10/1989

* cited by examiner

*Primary Examiner*—Jay Patidar
(74) *Attorney, Agent, or Firm*—Leydig, Voit & Mayer, Ltd.

(57) ABSTRACT

An apparatus for sensing rotary position that is particularly suited for electrical rotary actuators. The sensing apparatus comprises a magnet and a hall effect detector, both of which are arranged along the axis of rotation. The hall effect detector senses the angle of the return loop of magnetic flux lines from the north to the south pole of the magnet. When the magnet rotates relative to the hall effect detector, the angle of the magnetic flux lines changes which is detected by the hall effect detector. The arrangement of the magnet and the hall effect detector on the shaft axis of a rotary actuator avoids the magnetic flux line interference that is naturally produced by electrical actuators.

18 Claims, 4 Drawing Sheets

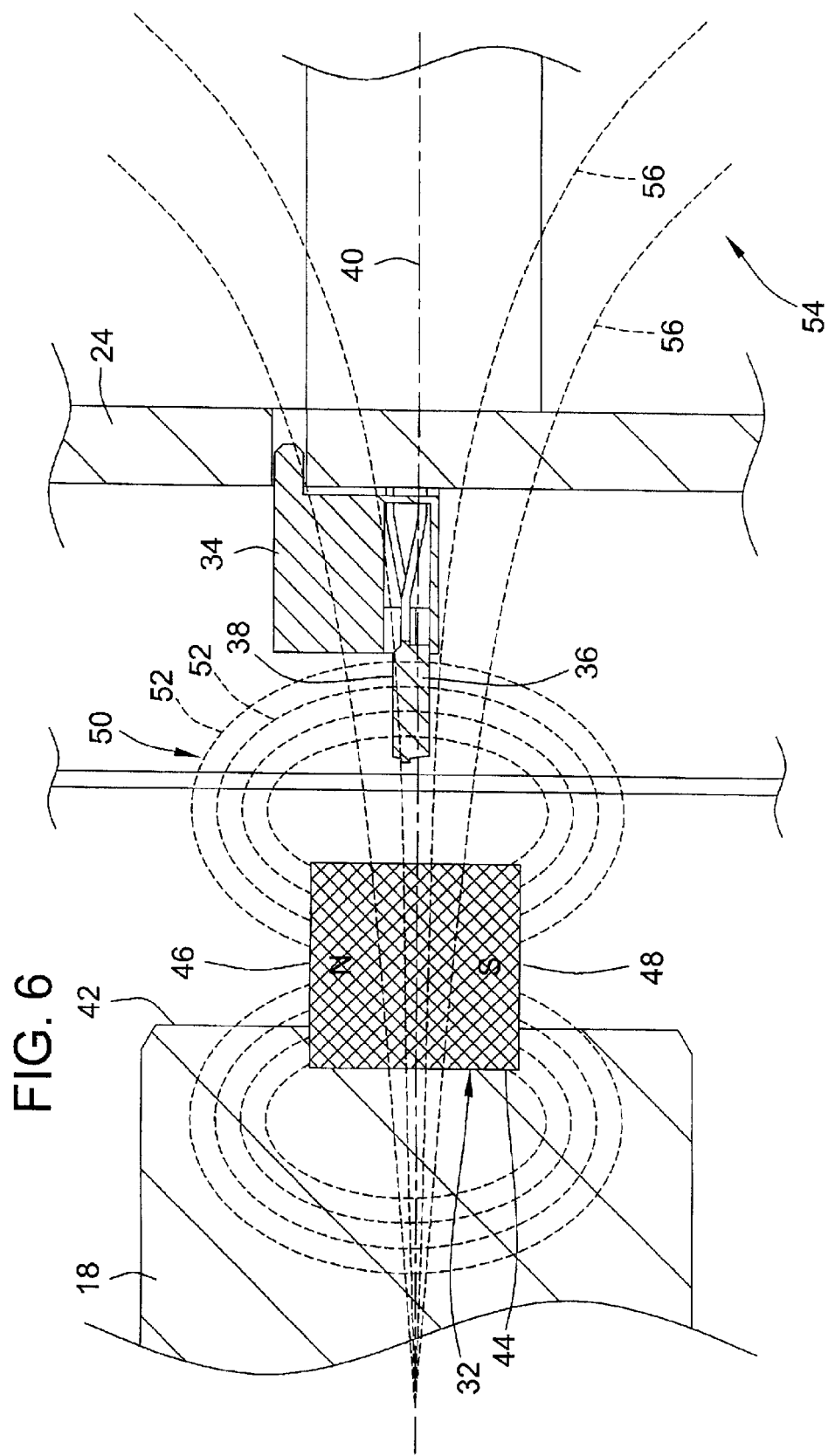

LINE HALL EFFECT DETECTOR AND METHOD OF SENSING ANGULAR POSITION PARTICULARLY SUITED FOR ELECTRICAL ROTARY ACTUATOR

FIELD OF THE INVENTION

The present invention relates generally to apparatus and methods for sensing rotary or angular position, and specifically magnetic field sensors such as hall effect detectors with an arrangement particularly suited for electrical rotary actuators.

BACKGROUND OF THE INVENTION

There are a variety of known magnetic sensor technologies including magnetoinductive sensors, flux-gate sensors, magnetoresitive sensors and hall effect detectors. Hall effect detectors are the smallest and least expensive of these sensors. The operating theory of a hall effect detector is simple. If the magnetic flux lines of a magnetic field impinge pependicularly on a thin panel carrying a current, a voltage develops across the sides of the panel which can be measured. Due to compact size and cost considerations, hall effect detectors have been widely used in electrical rotary actuators for industrial applications.

One traditional method of employing a hall effect detector for sensing rotary position has been to offset the hall effect detector from the axis of rotation and employ a ring magnet (e.g. having two north poles and two south poles) about the shaft. The hall effect detector and ring magnet are arranged in a plane perpendicular to the shaft axis such that when the shaft rotates, the faces of the north and south poles cyclically pass directly in front of the sensing surface of the hall effect detector. One of the significant problems with this approach occurs when the sensor is closely coupled to an electromagnetic actuator. In this application, magnetic leakage fields develop due to the wire coil and emit out the end of the device. This can interfere with the sensor signal. This leads to accuracy problems. The sensor output is also sensitive to proper sensor and ring magnet positioning (e.g. providing the proper gap between the sensor and the ring magnet).

An attempt to solve this problem has been to mount a yoke to the end of the shaft. The yoke carries two magnets on opposite sides which are adapted to rotate around the hall effect detector which is mounted to the stator stationary on the axis. The yoke thus surrounds the hall effect detector such that the hall effect detector and the magnets are arranged in a plane perpendicular to the shaft axis. When the shaft rotates, the faces of north and south poles cyclically pass directly in front of the sensing surface of the hall effect detector. Again, this method is sensitive to proper placement and the gap between the magnets and the sensor. With the hall effect detector on the axis, the magnetic leakage fields do not substantial interfere with the sensor signal. However, the implementation of this method requires extra cost and parts of the yoke/magnet assembly. This method also requires extra space at the shaft end to accommodate the yoke which is undesirable for compact applications.

SUMMARY OF THE INVENTION

It is an object of the present invention to provide a rotary position sensor and method that overcomes these and other problems existing in the art, and that may be particularly suited for electrical rotary actuators.

An apparatus for sensing rotary position, comprising an in line magnet and a hall effect detector or other suitable magnetic sensor. The magnet is axially aligned with the hall effect detector in spaced relation along an axis. The magnet has radially spaced apart north and south poles with the imaginary line between the poles intersecting the axis. With this arrangement, the hall effect detector senses relative rotation between the hall effect detector and the magnetic about the axis.

It is a significant aspect of the present invention that the novel rotary position sensing apparatus is incorporated into an electrical actuator in a novel manner. According to this aspect, the electrical actuator includes a stator comprising a lamination stack and wire coils and a rotor adapted to be rotated by the stator. The rotor comprises an output shaft carried by the stator for rotation about an axis. A magnet is fixed to an end of the output shaft and rotates in unison with the shaft. The magnet has a north pole and a south pole which emit a magnetic field having magnetic flux lines traveling in a return loop from the north to the south pole. The return loop intersects the axis. A sensor is mounted in a stationary position on the stator and axially spaced from the magnet along the axis. The sensor senses an angle of magnetic flux lines traveling along the return loop. When the shaft rotates, the magnetic flux lines rotate with the magnet to impinge upon the sensor at different angles such that the sensor has an output related to the angular position of the shaft. In the preferred embodiment, the magnet and sensor are on the center axis so that the stator field interference is minimized. Given the sensing of the return field, it is a further advantage that the sensor is less sensitive to precise positioning of the sensor in the plane normal to the axis of the shaft.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 6 is an enlarged cross section of a portion of FIG. 1 with the magnetic field of the sensor magnet and the magnet leakage field of the electrical actuator being schematically indicated.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
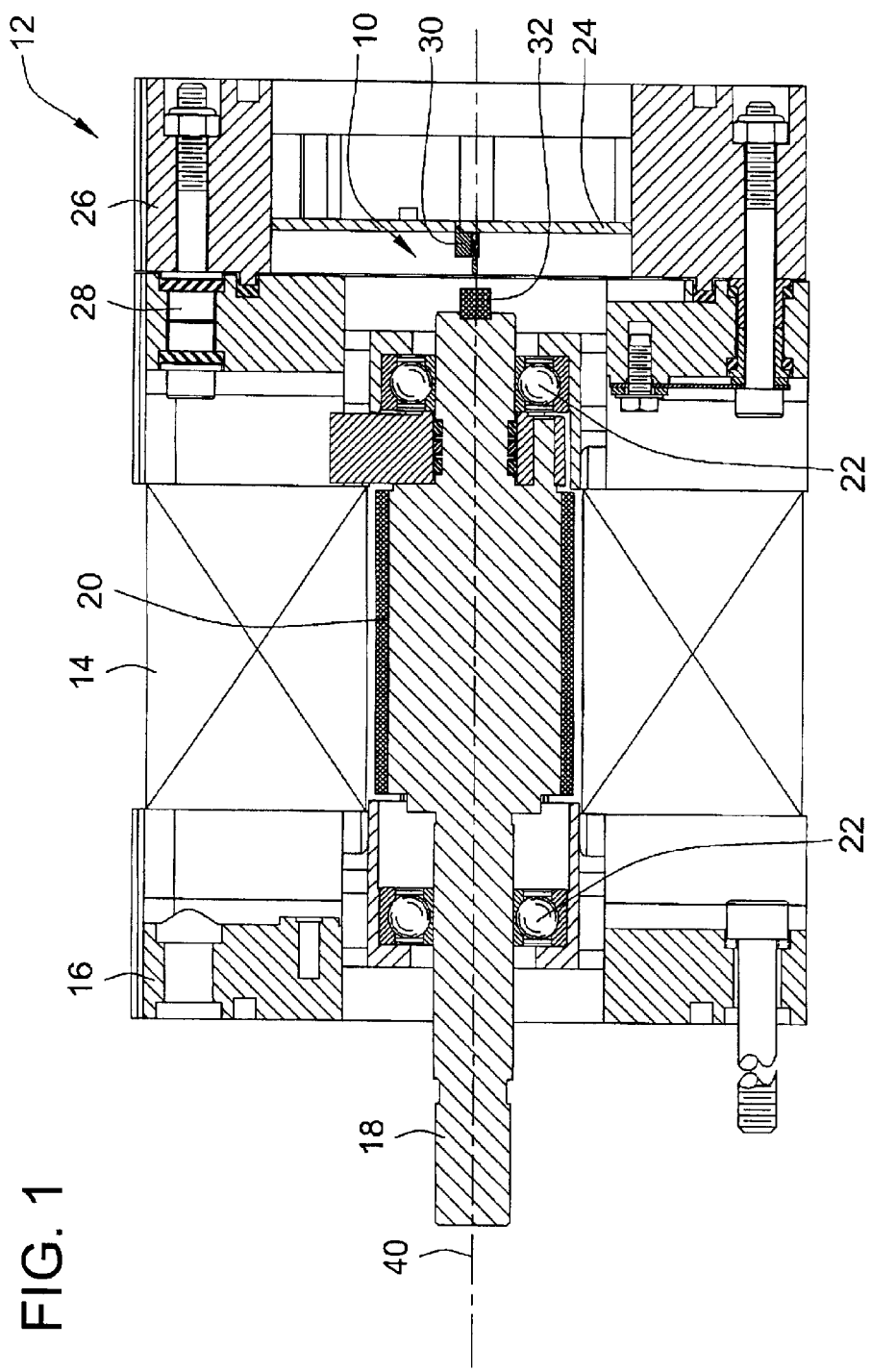
FIG. 1 is a cross section of an electrical actuator according to a preferred embodiment of the present invention.
Figure 2:
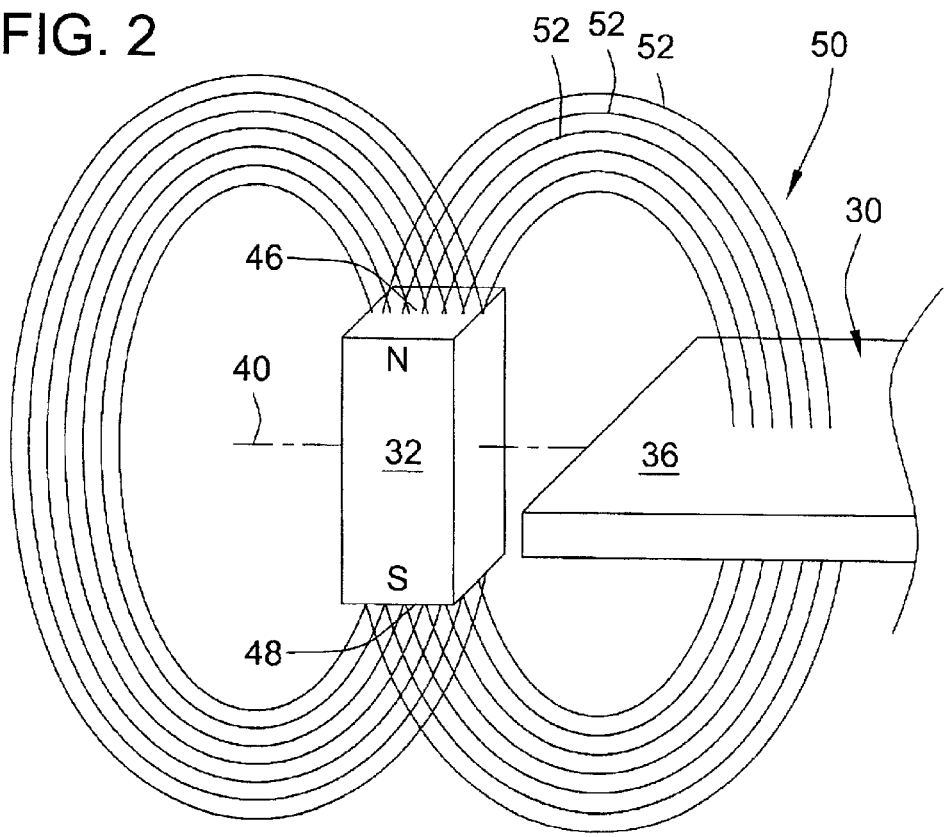
FIGS. 2–4 are isometric views of the sensing apparatus according to a preferred embodiment of the present invention with different relative positions between the magnet and sensor among FIGS. 2–4 and with magnetic flux lines being schematically indicated.

For purposes of illustration, and referring to FIGS. 1 and 2, a preferred embodiment of the present invention is illustrated as a magnetic sensor apparatus 10 incorporated into an electrical rotary actuator 12. The rotary actuator 12 has a lamination stack/wire coils 14 secured within a stator housing 16 for a stator and an output shaft 18 having permanent magnets 20 for the rotor. The shaft 18 is journalled in spaced apart radial bearing sets 22 for rotation about an axis 40. This particular rotary actuator 12 disclosed herein is of the variable position type adapted to rotate the shaft 18 between two angular positions (and position the shaft in discrete positions therebetween). As will be explained further below, the magnetic sensor apparatus 10 indicates angular position of the rotor, although the rotary actuator may be continuously rotating motor in which the magnetic sensor apparatus 10 would have and output to indicate the number of revolutions. Although one preferred application herein is disclosed, it will be appreciated to those skilled in the art that the magnetic sensor apparatus 10 may also have other applications in other rotary machines to which certain broader claims apply.

The stator includes integral electronics in the form of an electronics board 24 mounted in an electronics housing 26. The electronics housing 26 is secured to the stator housing via vibrations isolators 28. Further details the vibration isolators and other aspects of the disclosed electrical rotary actuator can be bad to U.S. application Ser. Nos. 09/793,225, 09/795,045 and 09/793,151, (now U.S. Pat. No. 6,467,587) assigned to the present assignee and filed on the same date as the instant application, the entire disclosures of which are hereby incorporated by reference. The electronics is operable to control the position of the shaft 18 as desired. The magnetic sensor apparatus 10 is connected to the integral electronics provide for closed loop control or position verifying feedback.

The magnetic sensor apparatus 10 includes a detector or sensor in the form of a hall effect detector 30 and a magnet 32. The hall effect detector 30 is stationary having a mount 34 secured to the electronics board 24 and a thin film or sensing panel 36. The hall effect detector 30 and more specifically the panel 36 is aligned on the rotational axis 40 and in a plane parallel to the axis 40. The hall effect detector 30 detects magnetic flux lines of a magnetic field that impinge perpendicularly on the panel 36. Specifically, impingement of the magnetic flux lines causes a voltage to develop across the sides of the panel 36 which can be measured and translated into an output representative of the sensed magnetic field.

The magnet 32 is mounted to the shaft end 42 by such means a gluing the magnet 32 into a formed recess 44. The magnet 32 includes a north pole 46 at one face and a south pole 48 at the opposite face. The imaginary line between the north and south poles 46, 48 intersects the rotational axis 40 and runs perpendicular to the axis 40 in the disclosed embodiment. As shown schematically in FIGS. 2–4 and 6, the magnet 32 creates a magnetic field 50 with magnetic flux lines 52 traveling from the north pole 46 to the south pole 48 in a return loop. With the magnet orientation of the disclosed embodiment, the magnetic flux lines 52 intersect the axis 40 perpendicularly.

In contrast to prior art arrangements of hall effect detectors and magnets, the magnet 32 and hall effect detector 30 of the disclosed embodiment are axially spaced apart and are both located on the rotational axis 40 as illustrated in the various figures. Instead of sensing the face of a magnet, the hall effect detector 30 of the disclosed embodiment senses the return loop of the flux lines 52. As indicated above, the hall effect detector 30 detects magnetic flux lines of a magnetic field that impinge perpendicularly on the sensing panel 36.

Figure 5:
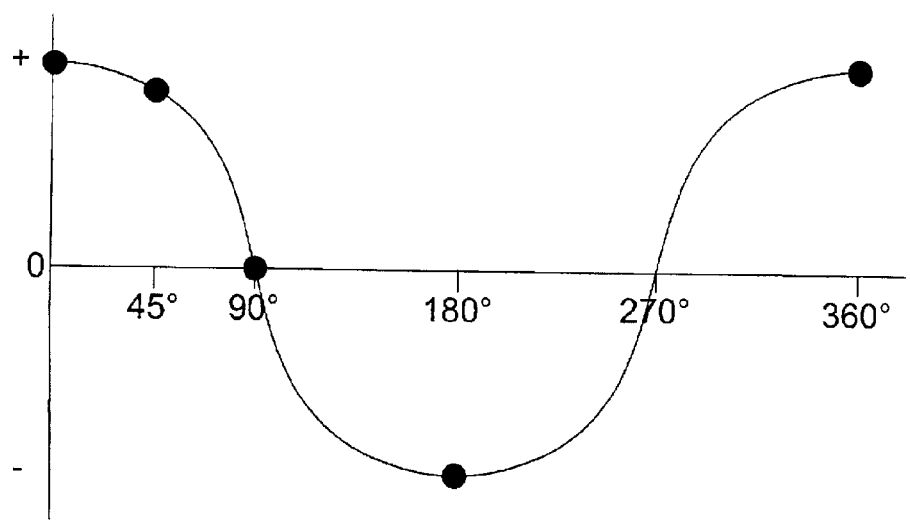
FIG. 5 is a graph illustrating the sensor output based upon angular position of the magnet (including the positions shown in FIGS. 2–4) and therefore the shaft relative to sensor.

When the magnet 32 is aligned perpendicularly to the sensing panel 36 as shown in FIG. 2, the magnetic flux lines 52 intersect the sensing panel 36 at a perpendicular angle as shown in FIG. 2. In this position, the hall effect detector 32 senses the maximum magnetic field emitted by the magnet 32 at the given axial spacing. This defines the maximum voltage differential across the sides of the panel which is indicated in FIG. 5. For purposes of reference and differentiating different positions, the position of the shaft and magnetic illustrated in FIG. 2 have been designated as the home position or 0° degrees of rotation.

Figure 3:
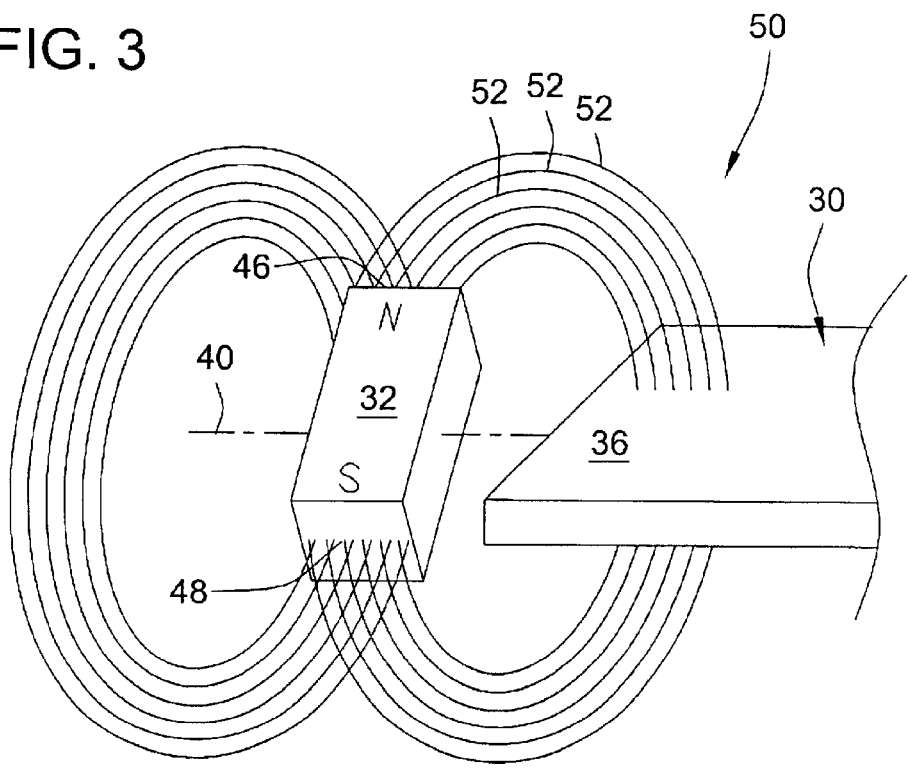

As the magnet 32 rotates from the home position and relative to the sensing panel 36, the magnetic flux lines 52 no longer intersect the sensing panel 36 at a pure perpendicular angle, but instead at an inclined angle. For example as shown in FIG. 3, the magnet 32 has been rotated 45° relative to position of FIG. 2. At the 45° position, the magnetic flux lines 52 intersect the sensing panel 36 at an inclined angle. At an inclined position, the hall effect detector 30 detects only the perpendicular vector component of the inclined magnetic flux lines 52 and does not sense any vector component running parallel to the sensing surface 36. Using mathematical trig functions, the voltage magnitude across the sides of the sensing panel 36 at any angular position relative to the home or 0° position can be calculated and is equivalent to the SIN of the angle from the home position times the voltage magnitude at the home position. Thus, at the 45°, the magnitude of the voltage differential is the SIN of 45° times the voltage magnitude at the home position as shown in FIG. 5.

Figure 4:
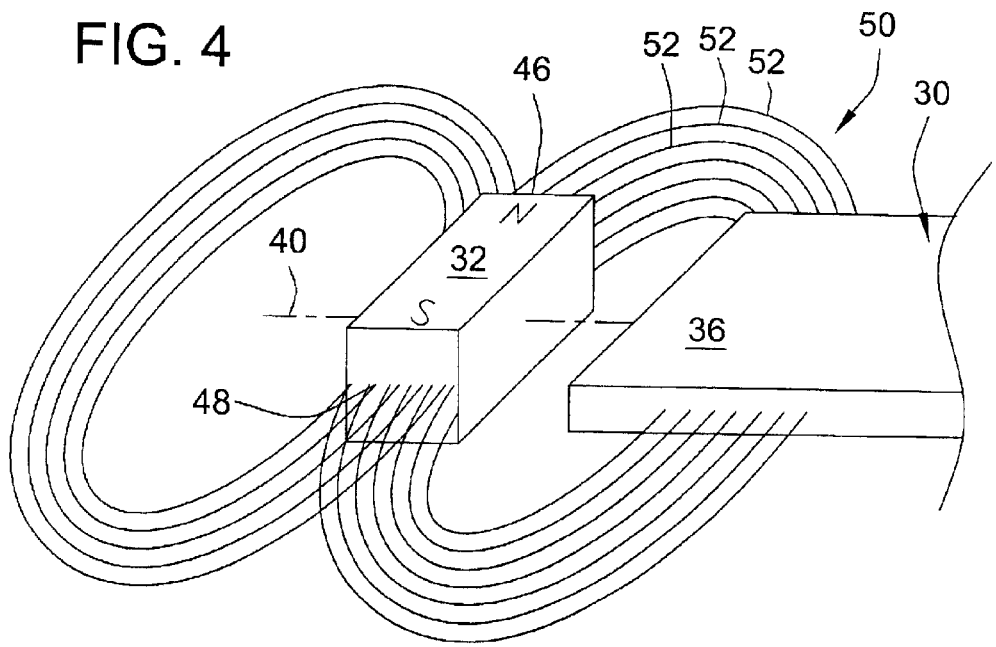

As the magnet 32 continues to rotate, the perpendicular vector component continues to diminish ultimately until it becomes zero at the 90° position illustrated in FIG. 4 at which point the magnetic flux lines 52 run parallel to the sensing panel 36. This point is also shown in FIG. 5 and the voltage differential across the sensing panel 36 becomes effectively zero or is otherwise negligible. As the magnet 32 continues to rotate, the magnetic flux lines 52 travel in the reverse direction through the sensing panel 36 which provides a negative voltage differential. At this point, it should be evident that angular position of the magnet 32 and therefore the angular position of the shaft 18 to which it is affixed is readily determined by the output of the hall effect detector 30. As the shaft 18 and magnet 32 rotates a complete 360°, the hall effect detector 30 produces an electrical output in the form of a complete sin wave. By knowing the magnitude of output of the hall effect detector 30 at the home position, the angular position of the magnet 32 and shaft 18 can be determined in relation to the SIN wave illustrated in FIG. 5.

In the disclosed embodiment, the hall effect detector 30 has also been arranged to avoid the magnetic leakage field 54 that is naturally produced as a byproduct of the action of the lamination stack/wire coils 14 of the electrical rotary actuator 12 during operation as indicated in FIG. 6. As shown in FIG. 6, the magnetic leakage field 54 includes magnetic flux lines 56 that typically run generally parallel to the sensing panel 36 such that there is negligent effect on the output of the hall effect detector 30. In addition, given the smaller gradient of the return field, the sensor is less sensitive to precise placement in the plane normal to the shaft.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for facilitating rotation and sensing angular position, comprising:

a sensor magnet arranged on an axis having a north pole and a south pole, the sensor magnet emitting a magnetic field having magnetic flux lines traveling in a return loop from the north to the south pole, the return loop intersecting the axis;

a sensor responsive to the magnetic field, the sensor being axially displaced from the sensor magnet and sensing an angle of magnetic flux lines traveling along the return loop, wherein relative rotation about the axis between the sensor magnet and the sensor causes the magnetic flux lines impinging upon the sensor to change angle, the sensor having an output related to the angle of magnetic flux lines and corresponding to relative angular positions between the sensor magnet and the sensor;

wherein the north pole and south pole lie transverse to the axis and on opposite sides of the axis, such that the return loop of magnetic flux lines intersect the axis transversely;

wherein the sensor is a hall effect detector; and an electrical rotary actuator including a stator having coils surrounding the axis, and a rotor including at least one permanent magnet mounted to the shaft, the actuator having a magnetic leakage field having magnetic flux lines extending axially out of the end of a shaft, the sensor being arranged so as to avoid sensing the magnetic flux lines of the magnetic leakage field, the sensor and the sensor magnet being operable arranged on the rotor and the stator for sensing angular position of the rotor relative to the stator.

2. The apparatus of claim 1 wherein the sensor includes a planar sensing panel sensing said magnetic flux line, the planar sensing panel lying in a plane lying parallel and along the axis such that when said line is perpendicular to the axis the return loop of magnetic flux lines intersect the planar sensing panel perpendicularly.

3. The apparatus of claim 2 wherein the sensor has an output representing a complete sin wave for a complete relative rotation of 360° about the axis between the sensor and the sensor magnet.

4. The apparatus of claim 1 wherein the sensor magnet is mounted to the shaft for rotation the sensor is mounted stationary to the stator adjacent the sensor magnet.

5. The apparatus of claim 1 wherein the sensor is free of baffles such that the magnetic flux lines passing through the sensor axe generally not redirected or guided.

6. The apparatus of claim 5, wherein the sensor is arranged in a generally parallel orientation relative to the axis.

7. An electrical actuator including an apparatus for sensing rotary position thereof, comprising:

a stator comprising wire coils;

a rotor adapted to be rotated by the stator comprising an output shaft carried by the stator for rotation about an axis, and at least one permanent magnet mounted to the shaft such that the actuator has a magnetic leakage field having magnetic flux lines extending axially out of the end of a shaft;

a sensor magnet fixed to an end of the output shaft, the sensor magnet having a north pole and a south pole, the sensor magnet emitting a magnetic field having flux lines traveling in a return loop from the north to the south pole, the return loop intersecting the axis;

a sensor responsive to the magnetic field in a stationary position on the stator axially spaced from the sensor magnet along the axis, the sensor sensing an angle of magnetic flux lines traveling along the return loop, wherein when the shaft rotates, the magnetic flux lines rotate with the sensor magnet to impinge upon the sensor at a different angle, the sensor having an output related to the angle of the magnetic flux lines and corresponding to position of the shaft; and wherein the sensor is on the axis and is arranged so as to avoid sensing the magnetic flux lines of the magnetic leakage field, and wherein the sensor is a hall effect detector.

8. The electrical rotary actuator of claim 7 wherein the north pole and south pole lie along a line perpendicular to the axis and on apposite sides of the axis, such that the return loop of magnetic flux lines intersect the axis perpendicularly.

9. The electrical rotary actuator of claim 8, wherein the sensor includes a planar sensing panel sensing said magnetic flux line, the planar sensing panel lying in a plane lying parallel and along the axis such that when said line is perpendicular to the axis the return loop of magnetic flux lines intersect the planar sensing panel perpendicularly.

10. The electrical rotary actuator of claim 9 wherein the sensor has an output representing a complete sin wave for a complete rotation of shaft 360° about the axis.

11. The electrical rotary actuator of claim 7 wherein the electrical rotary actuator emits a magnetic leakage field with magnetic flux lines emitting from the end of the shaft, the magnetic flux lines of the leakage field intersecting the planar sensing panel substantially parallel such that the natural flux lines have an insubstantial effect on the output of the hail effect detector.

12. The electrical rotary actuator of claim 11 wherein the electrical rotary actuator is of a variable position type oscillating the rotor among a plurality of discrete angular positions.

13. The electrical actuator of claim 7, wherein the sensor is free of baffles such that the magnetic flux lines passing through the sensor are generally not redirected or guided.

14. The electrical actuator of claim 13, wherein the sensor is arranged in a generally parallel orientation relative to the axis.

15. An apparatus for facilitating rotation and for sensing rotary position, the apparatus comprising: a sensor magnet and a hail effect detector, the sensor magnet in axial spaced relation to the hall effect detector relative to an axis of rotation, wherein the hall effect detector is on the axis, the sensor magnet having north and south poles spaced apart radially with a line between the poles intersecting the axis, wherein the hall effect detector senses relative rotation between the hall effect detector and the sensor magnet about the axis, and wherein the hall effect detector is free of baffles such that the magnetic flux lines passing through the sensor are generally not redirected or guided, and wherein the sensor is arranged in a non-perpendicular orientation to the axis; and an electrical rotary actuator including a stator having coils surrounding the axis, and a rotor including at least one permanent magnet mounted to the shaft, the actuator having a magnetic leakage field having magnetic flux lines extending axially out of a shaft, the sensor being arranged so as to avoid sensing the magnetic flux lines of the magnetic leakage.

16. The apparatus of claim 15 wherein the north pole and south pole lie along a line perpendicular to the axis, such that the sensor magnet produces a return loop of magnetic flux lines that intersect the axis perpendicularly.

17. The apparatus of claim 16 wherein the hall effect detector includes a planar sensing panel sensing said magnetic flux lines, the planar sensing panel lying in a plane lying parallel and along the axis such that when said line is perpendicular to the axis the return loop of magnetic flux lines insect the planar sensing panel perpendicularly.

18. The apparatus of claim 17 wherein the sensor has an output representing a complete sin wave for a complete relative rotation of 360° about the axis between the sensor and the sensor magnet.

* * * * *

UNITED STATES PATENT AND TRADEMARK OFFICE
CERTIFICATE OF CORRECTION

| | | |
|---|---|---|
| PATENT NO. | : 6,771,065 B2 | Page 1 of 1 |
| APPLICATION NO. | : 09/793356 | |
| DATED | : August 3, 2004 | |
| INVENTOR(S) | : Jon S. Pointer | |

It is certified that error appears in the above-identified patent and that said Letters Patent is hereby corrected as shown below:

In claim 8, column 6, line 25, change "apposite" to -- opposite --.

In claim 11, column 6, line 42, change "hail" to -- hall --.

In claim 15, column 6, line 55, change "hail" to -- hall --.

In claim 15, column 7, line 3, after "axially out", insert -- of the end --.

Signed and Sealed this

Nineteenth Day of February, 2008

JON W. DUDAS
*Director of the United States Patent and Trademark Office*